US012645480B2

(12) United States Patent
Na et al.

(10) Patent No.: US 12,645,480 B2
(45) Date of Patent: Jun. 2, 2026

(54) COMMUNICATION METHOD BETWEEN VIRTUAL MACHINES USING MAILBOXES, SYSTEM-ON-CHIP PERFORMING THE COMMUNICATION METHOD, AND IN-VEHICLE INFOTAINMENT SYSTEM INCLUDING SAME

(71) Applicant: SAMSUNG ELECTRONICS CO., LTD., Suwon-si (KR)

(72) Inventors: Sowon Na, Suwon-si (KR); Gyunghoon Kwon, Suwon-si (KR); Ji-Heon Oh, Suwon-si (KR)

(73) Assignee: Samsung Electronics Co. Ltd., Suwon-Si (KR)

( * ) Notice: Subject to any disclaimer, the term of this patent is extended or adjusted under 35 U.S.C. 154(b) by 833 days.

(21) Appl. No.: 17/952,955

(22) Filed: Sep. 26, 2022

(65) Prior Publication Data

US 2023/0305878 A1 Sep. 28, 2023

(30) Foreign Application Priority Data

Mar. 22, 2022 (KR) ........................ 10-2022-0035617

(51) Int. Cl.
G06F 9/45 (2006.01)
G06F 9/455 (2018.01)
G06F 15/167 (2006.01)

(52) U.S. Cl.
CPC ...... G06F 9/45558 (2013.01); G06F 9/45545 (2013.01); G06F 15/167 (2013.01); G06F 2009/45583 (2013.01)

(58) Field of Classification Search
CPC .. G06F 9/45533; G06F 9/45545; G06F 9/544; G06F 9/546
See application file for complete search history.

(56) References Cited

U.S. PATENT DOCUMENTS

| | | | |
|---|---|---|---|
| 5,634,053 A | 5/1997 | Noble et al. | |
| 5,991,268 A | 11/1999 | Awdeh et al. | |
| 6,480,058 B2 | 11/2002 | Blanken | |
| 7,136,765 B2 | 11/2006 | Maier et al. | |
| 7,140,009 B2 | 11/2006 | Tal et al. | |
| 7,330,475 B2 | 2/2008 | Henrion | |
| 7,698,270 B2 | 4/2010 | Brave et al. | |
| 7,702,690 B2 | 4/2010 | Brave et al. | |
| 7,761,875 B2 | 7/2010 | Karamanolis et al. | |
| 7,937,701 B2 | 5/2011 | Kinney et al. | |
| 8,195,871 B2 | 6/2012 | Kim et al. | |

(Continued)

FOREIGN PATENT DOCUMENTS

| | | |
|---|---|---|
| DE | 102022117475 A1 | 2/2023 |
| DE | 112022001192 T5 | 12/2023 |

(Continued)

*Primary Examiner* — Andy Ho
(74) *Attorney, Agent, or Firm* — Fish & Richardson P.C.

(57) ABSTRACT

A system-on-chip includes; a first virtual machine, a second virtual machine, a first memory controller including a first mailbox, and configured to control operation of a memory device under control of the first virtual machine, and a second memory controller including a second mailbox, and configured to control operation of the memory device under control of the second virtual machine, wherein the first mailbox and the second mailbox are directly connected in hardware via a bus.

20 Claims, 6 Drawing Sheets

(56) References Cited

U.S. PATENT DOCUMENTS

| | | | |
|---|---|---|---|
| 8,862,807 B2 | 10/2014 | Yoon et al. | |
| 8,949,565 B2 | 2/2015 | Khosravi et al. | |
| 9,459,687 B2 | 10/2016 | Park et al. | |
| 9,460,110 B2 | 10/2016 | Klughart | |
| 9,507,722 B2 | 11/2016 | Desai et al. | |
| 9,575,951 B2 | 2/2017 | Midmore et al. | |
| 9,632,953 B2 | 4/2017 | Shacham et al. | |
| 9,635,111 B2 | 4/2017 | Wang et al. | |
| 9,652,343 B2 | 5/2017 | Klughart | |
| 9,690,720 B2 | 6/2017 | Shacham et al. | |
| 9,766,466 B2 | 9/2017 | Heinrich et al. | |
| 9,851,991 B2 | 12/2017 | Russinovich et al. | |
| 9,946,559 B1 | 4/2018 | Naftel et al. | |
| 9,948,720 B2 | 4/2018 | Wang et al. | |
| 9,953,804 B2 | 4/2018 | Fichter et al. | |
| 10,067,688 B2 | 9/2018 | Dorfman et al. | |
| 10,102,125 B2 | 10/2018 | Cha et al. | |
| 10,241,335 B2 | 3/2019 | Heinrich et al. | |
| 10,303,899 B2 | 5/2019 | Durham et al. | |
| 10,365,164 B2 | 7/2019 | Okamoto et al. | |
| 10,378,963 B2 | 8/2019 | Okamoto et al. | |
| 10,382,201 B1 | 8/2019 | Allo et al. | |
| 10,409,631 B2 | 9/2019 | Bonazzola | |
| 10,460,110 B1 | 10/2019 | Allo et al. | |
| 10,484,361 B2 | 11/2019 | Pappu et al. | |
| 10,613,881 B2 | 4/2020 | Lee et al. | |
| 10,657,092 B2 | 5/2020 | Pappu et al. | |
| 10,664,433 B2 | 5/2020 | Pappu et al. | |
| 10,725,706 B1 | 7/2020 | Boenapalli et al. | |
| 10,754,580 B2 | 8/2020 | Della Monica et al. | |
| 10,803,027 B1 | 10/2020 | Rogers et al. | |
| 10,891,078 B2 | 1/2021 | Brief et al. | |
| 10,963,355 B2 | 3/2021 | Varshney et al. | |
| 11,029,856 B2 | 6/2021 | Shin et al. | |
| 11,093,037 B2 | 8/2021 | Verschoor et al. | |
| 11,093,369 B2 | 8/2021 | Badrou et al. | |
| 11,099,762 B2 | 8/2021 | Hyung et al. | |
| 11,099,775 B2 | 8/2021 | Tseng | |
| 11,099,911 B1 | 8/2021 | Ikegami et al. | |
| 11,120,151 B1 | 9/2021 | Allo | |
| 11,150,837 B2 | 10/2021 | Kim et al. | |
| 11,153,269 B2 | 10/2021 | Lee et al. | |
| 11,283,676 B2 * | 3/2022 | Mishra | H04L 67/51 |
| 12,346,467 B2 * | 7/2025 | Hajnoczi | G06F 9/45558 |
| 2007/0250540 A1 | 10/2007 | Hsu | |
| 2009/0158247 A1 | 6/2009 | Tal | |
| 2010/0236975 A1 | 9/2010 | Yamka | |
| 2015/0347016 A1 | 12/2015 | Shacham et al. | |
| 2015/0347017 A1 | 12/2015 | Shacham et al. | |
| 2016/0011790 A1 | 1/2016 | Rostoker et al. | |
| 2017/0140133 A1 | 5/2017 | Wang et al. | |
| 2017/0187694 A1 | 6/2017 | Friedman et al. | |
| 2018/0088978 A1 * | 3/2018 | Li | G06F 9/45558 |
| 2020/0133571 A1 | 4/2020 | Kim et al. | |
| 2020/0150987 A1 | 5/2020 | Nair | |
| 2020/0201827 A1 | 6/2020 | Chacko | |
| 2020/0241625 A1 | 7/2020 | Boenapalli et al. | |
| 2020/0326672 A1 | 10/2020 | Ma et al. | |
| 2020/0371719 A1 | 11/2020 | Della Monica et al. | |
| 2020/0395503 A1 | 12/2020 | Wu et al. | |
| 2020/0395504 A1 | 12/2020 | Brodoceanu et al. | |
| 2020/0395519 A1 | 12/2020 | Brodoceanu et al. | |
| 2020/0395521 A1 | 12/2020 | Brodoceanu et al. | |
| 2021/0103457 A1 * | 4/2021 | Oohira | G06F 9/45558 |
| 2021/0103458 A1 | 4/2021 | Manousakis et al. | |
| 2021/0294654 A1 | 9/2021 | Boenapalli et al. | |
| 2024/0300537 A1 | 9/2024 | Krishnani et al. | |

FOREIGN PATENT DOCUMENTS

| | | | |
|---|---|---|---|
| DE | 112022003757 T5 | 5/2024 | |
| KR | 10-2017-0013270 A | 2/2017 | |
| KR | 10-1861471 B1 | 5/2018 | |

* cited by examiner

COMMUNICATION METHOD BETWEEN VIRTUAL MACHINES USING MAILBOXES, SYSTEM-ON-CHIP PERFORMING THE COMMUNICATION METHOD, AND IN-VEHICLE INFOTAINMENT SYSTEM INCLUDING SAME

CROSS-REFERENCE TO RELATED APPLICATION

This application claims priority under 35 U.S.C. § 119 to Korean Patent Application No. 10-2022-0035617 filed on Mar. 22, 2022 in the Korean Intellectual Property Office, the subject matter of which is hereby incorporated by reference in its entirety.

BACKGROUND

Embodiments of the inventive concept provide communication methods between virtual machines. More particularly, embodiments of the inventive concept provide communication methods between virtual machines using mailboxes included in memory controller(s). Other embodiments of the inventive concept provide system-on-chip devices performing communication methods between virtual machines using mailboxes, as well as in-vehicle infotainment systems such system-on-chip devices.

In past applications such as mobile devices, it was common for an embedded system to drive only a single operating system. However, with the emergence of electric vehicles, an embedded system within an electric vehicle may be used to drive a plurality of operating systems. With this configuration a so-called "hypervisor" is required to store data variously accessed (e.g., read or written) by the plurality of operating systems. In this regard, the hypervisor may be understood as a computational platform, program and/or operating system capable of managing one or more virtual machines. Accordingly, the hypervisor may be referred to as a virtual machine monitor or a virtual machine manager.

Further in this regard, the hypervisor may be used as an intermediate between a host virtual machine and a guest virtual machine, may isolate separate host virtual machines, and/or may allow the host virtual machine to support guest virtual machines executing different operating systems.

SUMMARY

Embodiments of the inventive concept provide system-on-chip devices capable of communicating messages between virtual machines without use of a hypervisor by using mailboxes associated with respective memory controllers, wherein the mailboxes are directly connected via a bus.

Embodiments of the inventive concept provide in-vehicle infotainment systems including such a system-on-chip.

Embodiments of the inventive concept provide methods of communicating messages between virtual machines without use of a hypervisor by using mailboxes associated with respective memory controllers, wherein the mailboxes are directly connected via a bus.

In some embodiment, the inventive concept provides a system-on-chip including; a first virtual machine, a second virtual machine, a first memory controller including a first mailbox, and configured to control operation of a memory device under control of the first virtual machine, and a second memory controller including a second mailbox, and configured to control operation of the memory device under control of the second virtual machine, wherein the first mailbox and the second mailbox are directly connected in hardware via a bus.

In some embodiment, the inventive concept provides an in-vehicle infotainment system including; a nonvolatile memory device, and a system-on-chip configured to control operation of the nonvolatile memory device. Here, the system-on-chip may include; a first virtual machine, a second virtual machine, a first memory controller including a first mailbox, and configured to control operation of the nonvolatile memory device under control of the first virtual machine, and a second memory controller including a second mailbox, and configured to control operation of the nonvolatile memory device under control of the second virtual machine, wherein the first mailbox and the second mailbox are directly connected in hardware via a bus.

In some embodiment, the inventive concept provides method for communicating between a first virtual machine and a second virtual machine. Here, the method may include; generating a message using the first virtual machine, storing the message in a first mailbox associated with a first memory controller, checking the message sent to the second mailbox from the first mailbox using a second memory controller including a second mailbox, and sending the message stored in the second mailbox to the second virtual machine using the second memory controller, wherein the first mailbox and the second mailbox are directly connected via a bus.

BRIEF DESCRIPTION OF THE DRAWINGS

Advantages, benefits and features, as well as the making and use of the inventive concept may be better understood upon consideration of the following detailed description together with the accompanying drawings, in which:

FIGS. 4, 5 and 6 are respective, conceptual diagrams further illustrating operation of virtual machines and corresponding mailboxes when communicating messages associated with various operations in relation to the system-on-chip of FIG. 1.

DETAILED DESCRIPTION

Throughout the written description and drawings, like reference numbers and labels are used to denote like or similar elements, components and/or features.

Figure 1:
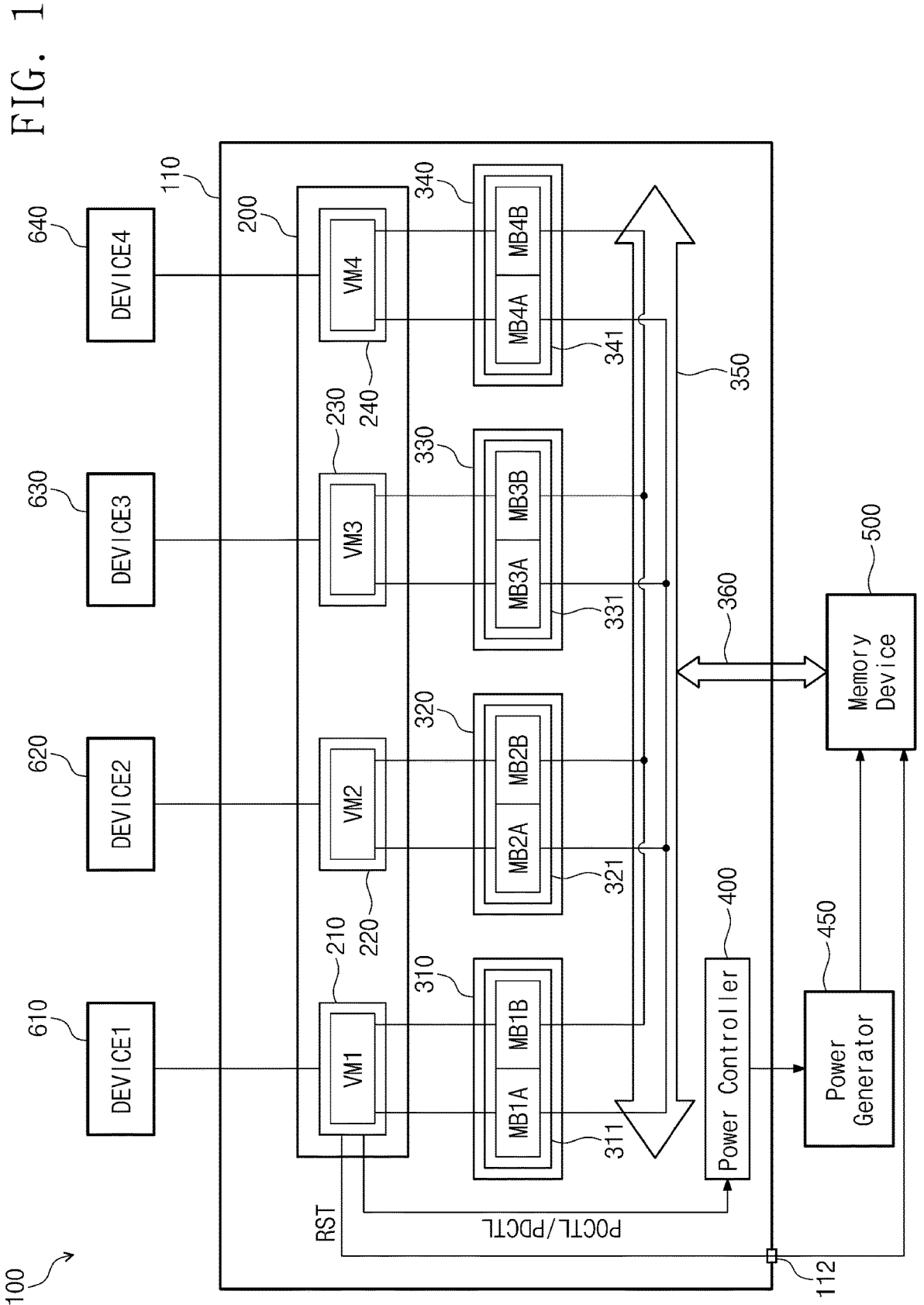
FIG. 1 is a block diagram illustrating an in-vehicle infotainment system including a system-on-chip capable of performing communication between virtual machines by using mailboxes according to embodiments of the inventive concept.

Figure (FIG. 1 is a block diagram illustrating an in-vehicle infotainment system 100 including a system-on-chip capable of performing communication between virtual machines using mailboxes according to embodiments of the inventive concept.

Referring to FIG. 1, the in-vehicle infotainment (IVI) system 100 may generally include a system-on-chip (SoC) 110, a power generator 450, a memory device 500, and a plurality of devices 610, 620, 630, and 640.

Here, the IVI system 100 may be understood as enabling, wholly or in part, an in-vehicle entertainment (ICE) system. That is, the IVI system 100 may include various hardware, firmware and/or software resources enabling audio and/or entertainment within a vehicle (e.g., automobile, van, truck, bus, etc.).

The IVI system 100 greatly expands entertainment options available in vehicles. Where once vehicles were limited to basic audio components such as a radio, a cassette player and/or a compact disk player, more contemporary vehicles may provide various dashboard system(s), display system(s), a navigation system, a video player, Universal Serial Bus (USB) and/or Bluetooth connectivity, in-vehicle-computers (e.g., carputers), and in-vehicle internet options, such as Wi-Fi.

In some embodiments, the SoC 110 may include a reset pin 112, a multi-core processor 200, a plurality of memory controllers (also referred to as host controller) 310, 320, 330, and 340, various connectivities 350 and 360 (e.g., a first bus 350 and a second bus 360), and a power controller 400.

The reset pin 112 may be used to send (or communicate) a reset signal RST—which may be provided by a first virtual machine 210 operating as a host virtual machine—to the memory device 500, wherein the memory device 500 is reset in response to the reset signal RST. In some embodiments, the reset pin 112 may be implemented using a general-purpose input/output (GPIO) pin.

The multi-core processor 200 may include a plurality of cores 210, 220, 230, and 240, wherein each of the plurality of cores 210, 220, 230, and 240 may be used to respectively execute a corresponding operating systems (OS). Here, each of the operating systems (OSs), respectively executable in one of the plurality of cores 210, 220, 230, and 240 may be understood as constituting a "virtual machine" (e.g., VM1, VM2, VM3, and VM4). In some embodiments, the multi-core processor 200 may be referred to as a computer processor, and may be implemented as a single integrated circuit (IC) including two or more processing cores (e.g., the plurality of cores 210, 220, 230, and 240), wherein each of the cores 210, 220, 230, and 240 may be used to independently execute programming code defining a sequence of instructions including instructions corresponding to data access operations, such as read operations and write operations.

In some embodiments, one of the virtual machines VM1, VM2, VM3, and VM4 may be designated and operated as a "host virtual machine" or a "physical host" (e.g. virtual machine VM1), whereas the other virtual machines (e.g., virtual machines VM2, VM3, and VM4) may be designated and operated as respective "guest virtual machines" or "virtual hosts."

During operation, the respective virtual machines VM1, VM2, VM3, and VM4 may communicate input/output (hereafter, "I/O") commands to a corresponding memory controller 310, 320, 330, and 340, and/or receive various responses from same (e.g., through the use of interrupts). Ready examples of I/O commands include; read commands, write commands, erase commands, etc.

Operating as a virtual machine host server, the host virtual machine may be further understood as constituting an underlying virtual machine that controls computational resources (e.g., power, clock(s), processing time, memory space, disk memory space, network connectivity, etc.) in order to efficiently support operation by the guest virtual machines. In this regard, each software component respectively associated with a virtual machine—that is, each guest virtual machine—may be further understood as a "guest OS" capable of completely separate and independent execution. Yet further in this regard, the authority of the host virtual machine (or physical host) is always greater than any one the guest virtual machines (the virtual hosts). The utility of this configuration becomes clear when the memory device 500 of the IVI system 100 is recognized as a common resource capable of being independently accessed by the virtual machines VM1, VM2, VM3, and VM4, However, only the host virtual machine VM1 may control (or exercise authority over the) operation of the memory device 500 (e.g., application of power, application or frequency definition of clock(s), reset (e.g., cold reset or warm reset).

In the illustrated example of FIG. 1, the first memory controller 310 may include a first mailbox 311 and may variously interact with the memory device 500 through the first and second buses 350 and 360 under control of the first virtual machine VM1. In some embodiments, the first mailbox 311 includes a first sub-mailbox MB1A and a second sub-mailbox MB1B.

Analogously, the second memory controller 320 includes a second mailbox 321 including a first sub-mailbox MB2A and a second sub-mailbox MB2B, and may interact with the memory device 500 through the first and second buses 350 and 360 under control of the second virtual machine VM2; the third memory controller 330 includes a third mailbox 331 including a first sub-mailbox MB3A and a second sub-mailbox MB3B, and may interact with the memory device 500 through the first and second buses 350 and 360 under control of the third virtual machine VM3; and the fourth memory controller 340 includes a fourth mailbox 341 including a first sub-mailbox MB4A and a second sub-mailbox MB4B, and may interact with the memory device 500 through the first and second buses 350 and 360 under control of the fourth virtual machine VM4.

Each of the memory controllers 310, 320, 330, and 340 may be variously implemented in hardware. Furthermore, each of the mailboxes 311, 321, 331, and 341 may be variously implemented in hardware. For example, each of the mailboxes 311, 321, 331, and 341 may be implemented as at least one, corresponding register(s) (hereafter for simplicity, "registers").

In some embodiments, first-first registers implementing the first sub-mailbox MB1A, second-first registers implementing the first sub-mailbox MB2A, third-first registers implementing the first sub-mailbox MB3A, and fourth-first registers implementing the first sub-mailbox MB4A may be directly connected in hardware (i.e., physically connected). Accordingly, when the first virtual machine VM1 communicates data (hereafter generically referred to as a "message") via the first sub-mailbox MB1A, the message written in the first sub-mailbox MB1A may thereafter be directly written in one or more of the first sub-mailboxes MB2A, MB3A, and MB4A. This scheme allows the virtual machines VM2, VM3, and VM4 to respectively check for and utilize a message written in the first sub-mailboxes MB2A, MB3A, and MB4A. Here, the term "directly connected" denotes a physical connection (e.g., via one or more bus(es)) between memory controllers and/or mailboxes (e.g., registers) associated with the memory controllers without material intervening device (e.g., a hypervisor, a processor, a memory, etc.)

The structure of various messages may vary by design, but may include a number of binary bits uniquely associated with content. For example, a power-on message (POMSG) may include "0x01", a power-off-ready message (PDMSG) may include "0x02", and a reset-ready message (SMSG) may include "0x03".

In some embodiment, first-second registers implementing the second sub-mailbox MB1B, second-second registers implementing the second sub-mailbox MB2B, third-second registers implementing the second sub-mailbox MB3B, and fourth-second registers implementing the second sub-mailbox MB4B may be physically connected in hardware. Accordingly, when the virtual machines VM2, VM3, and VM4 write respective messages in the second sub-mailboxes MB2B, MB3B, and MB4B-albeit with possible time differences, the messages written in the second sub-mailboxes MB2B, MB3B, and MB4B may be directly written in the second sub-mailbox MB1B. And this scheme allows the first virtual machine VM1 to check for and utilize messages written in the second sub-mailbox MB1B.

Thus, according to the foregoing description, each of the first sub-mailboxes MB1A, MB2A, MB3A, and MB4A may be understood as a "physical host-to-virtual host mailbox," whereas each of the second sub-mailboxes MB1B, MB2B, MB3B, and MB4B may be understood as a "virtual host-to-physical host mailbox."

Figure 2:
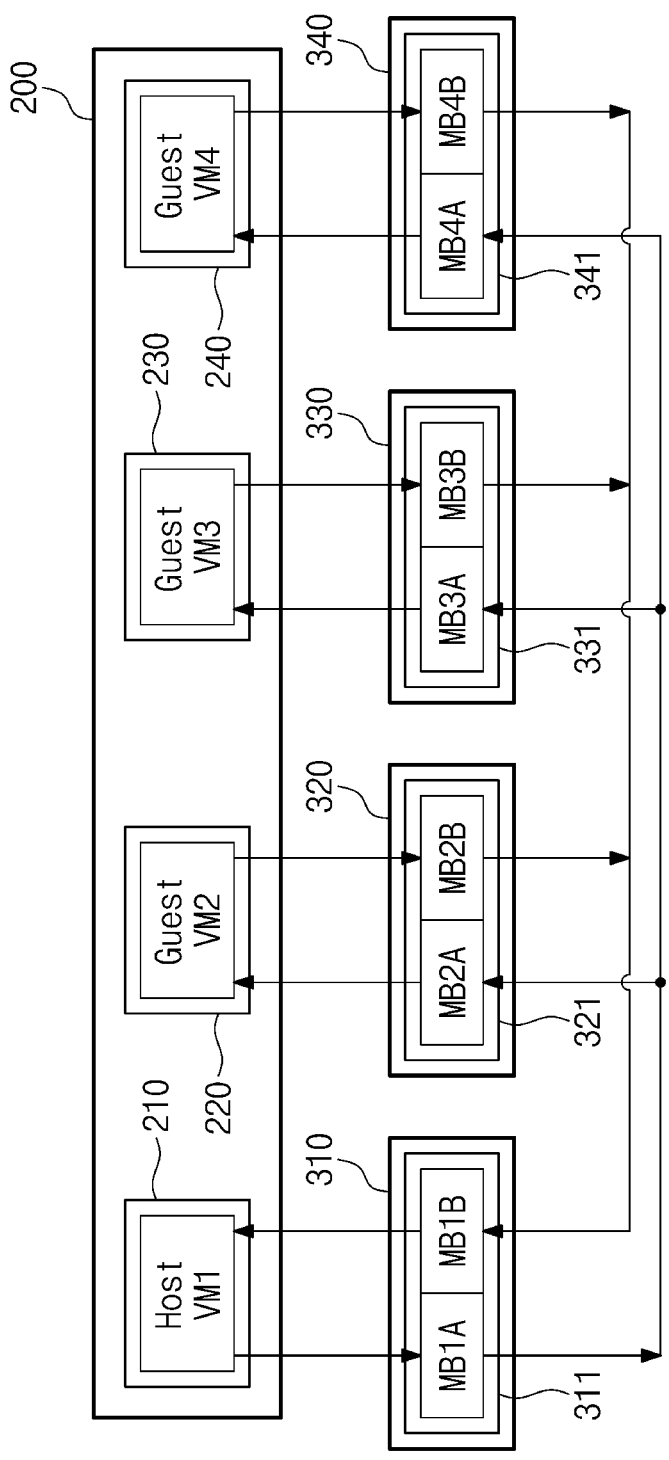
FIGS. 2 and 3 are respective block diagrams further illustrating mailbox functionality when communicating messages between virtual machines.

FIG. 2 is a conceptual diagram further illustrating in one example certain mailbox functionality between the control 200 including virtual machines VM1, VM2, VM3, and VM4 and the corresponding memory controllers 310, 320, 330 and 340 of FIG. 1. Here again, it is assumed that the first virtual machine VM1 operates as the host virtual machine, and the remaining virtual machines VM2, VM3, and VM4 operate as guest virtual machines.

Referring to FIG. 2, the first sub-mailbox MB1A of the first mailbox 311 may be used to send an outgoing message from the first virtual machine VM1 to one or more of the first sub-mailboxes MB2A, MB3A, and MB4A respectively associated with the mailboxes 321, 331, and 341. Further, the second sub-mailbox MB1B of the first mailbox 311 may be used to receive incoming message(s) from one or more of the second sub-mailboxes MB2B, MB3B, and MB4B respectively associated with the mailboxes 321, 331, and 341.

Figure 3:
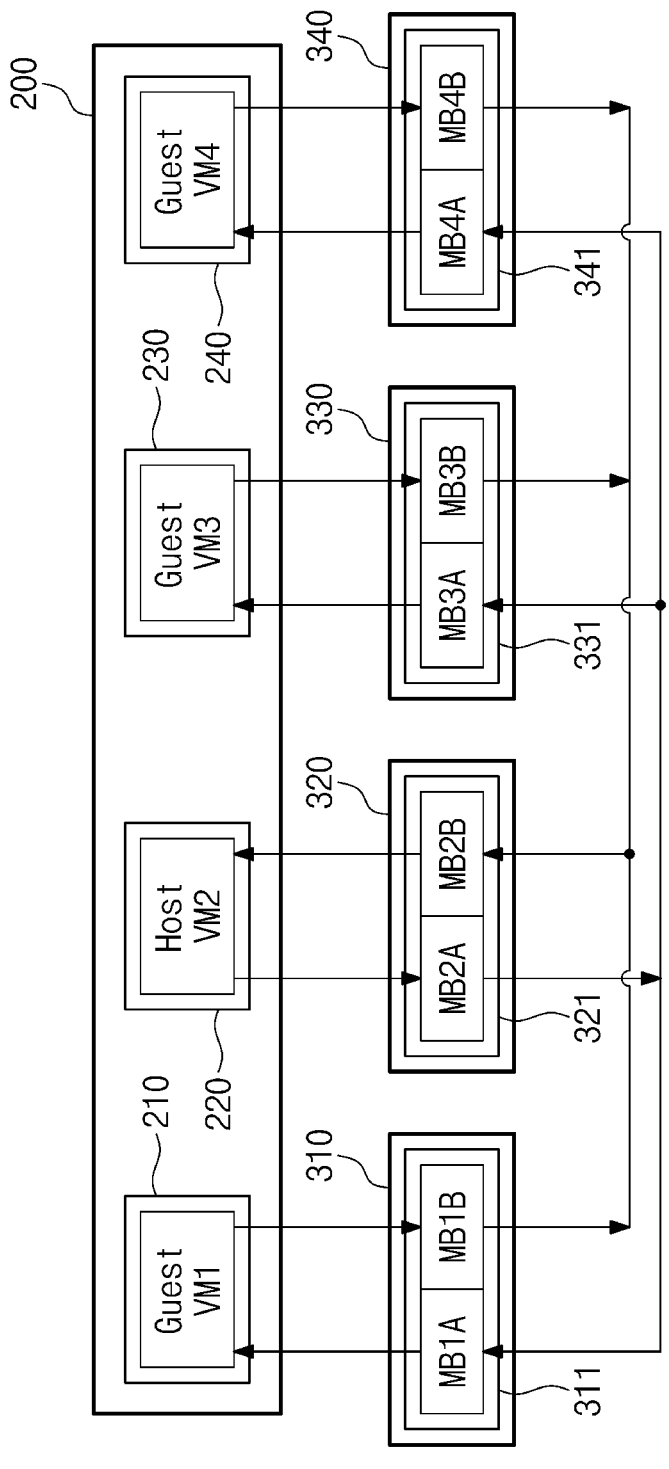

FIG. 3 is another conceptual diagram further illustrating in another example certain mailbox functionality between the control 200 including virtual machines VM1, VM2, VM3, and VM4 and the corresponding memory controllers 310, 320, 330 and 340 of FIG. 1. Here however, it is assumed that the second virtual machine VM2 operates as the host virtual machine, and the remaining virtual machines VM1, VM3, and VM4 operate as guest virtual machines.

Referring to FIG. 3, the first sub-mailbox MB2A of the second mailbox 321 may be used to send an outgoing message from the second virtual machine VM2 to one or more of the first sub-mailboxes MB1A, MB3A, and MB4A of the mailboxes 311, 331, and 341, and the second sub-mailbox MB2B of the first mailbox 321 may be used to incoming messages from the second sub-mailboxes MB1B, MB3B, and MB4B respectively associated with the mailboxes 311, 331, and 341.

Referring to FIGS. 1, 2 and 3, the first virtual machine VM1 may variously exchange messages with the second virtual machine VM2 using the first mailbox 311 and the second mailbox 321, may exchange messages with the third virtual machine VM3 using the first mailbox 311 and the third mailbox 331, and may exchange messages with the fourth virtual machine VM4 using the first mailbox 311 and the fourth mailbox 341.

Hereinafter, one example of a first message (e.g., a power-on message for the memory device 500) being exchanged between the virtual machines VM1, VM2, VM3, and VM4 will be described in relation to FIG. 4, another example of a second message (e.g., a power-off message for the memory device 500) being exchanged between the virtual machines VM1, VM2, VM3, and VM4 will be described in relation to FIG. 5, and still another example of a third message (e.g., a reset message for the memory device 500) being exchanged between the virtual machines VM1, VM2, VM3, and VM4 will be described in relation to FIG. 6.

In the context of these illustrated example, it will be understood that virtual machines implemented according to embodiments of the inventive concept may communicate using mailboxes respectively included in corresponding memory controllers (e.g., 310, 320, 330 and 340) and connected in hardware do not require intervention by a hypervisor to in order to facilitate communication of messages between virtual machines.

Figure 4:
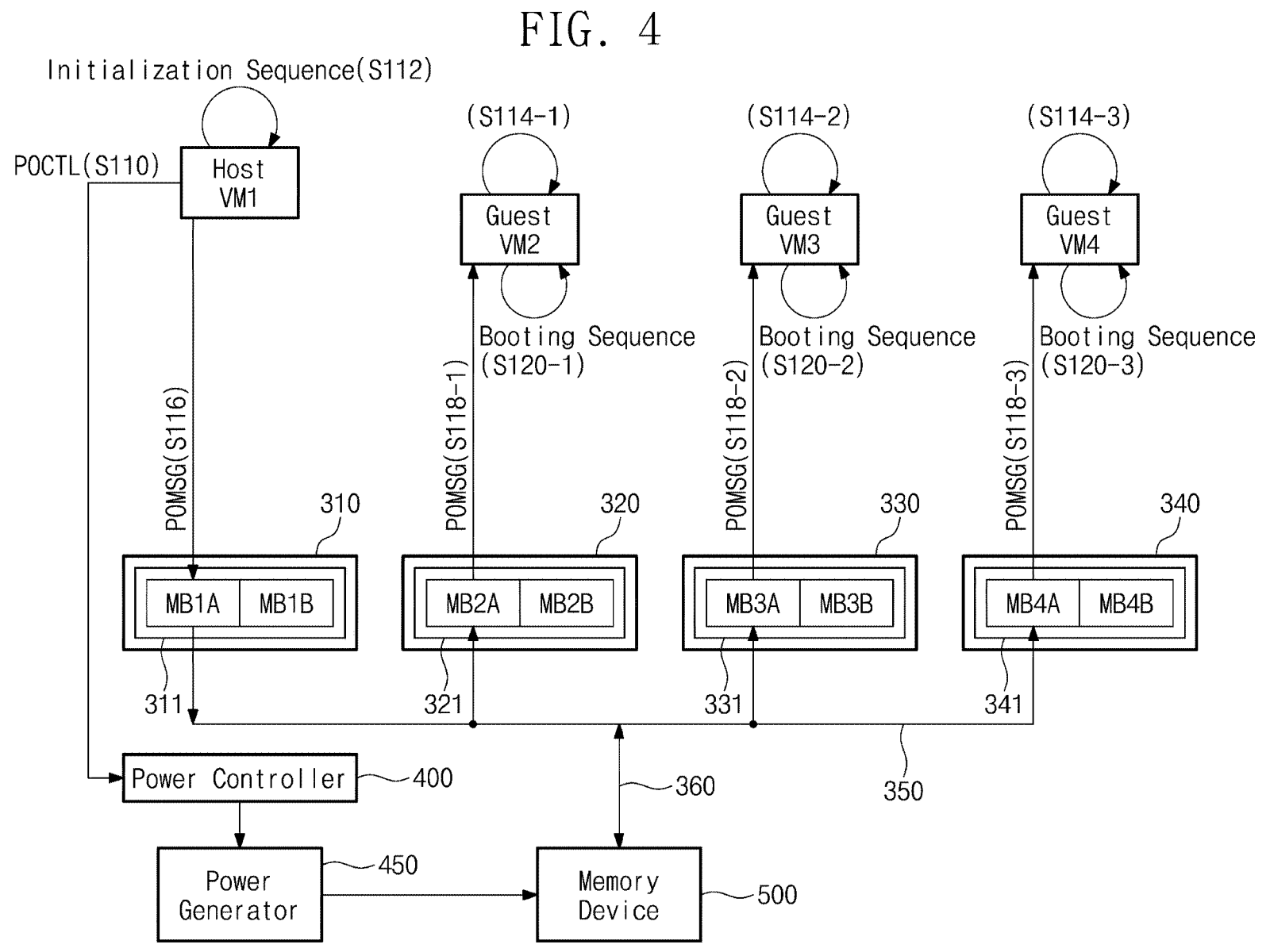
Figure 5:
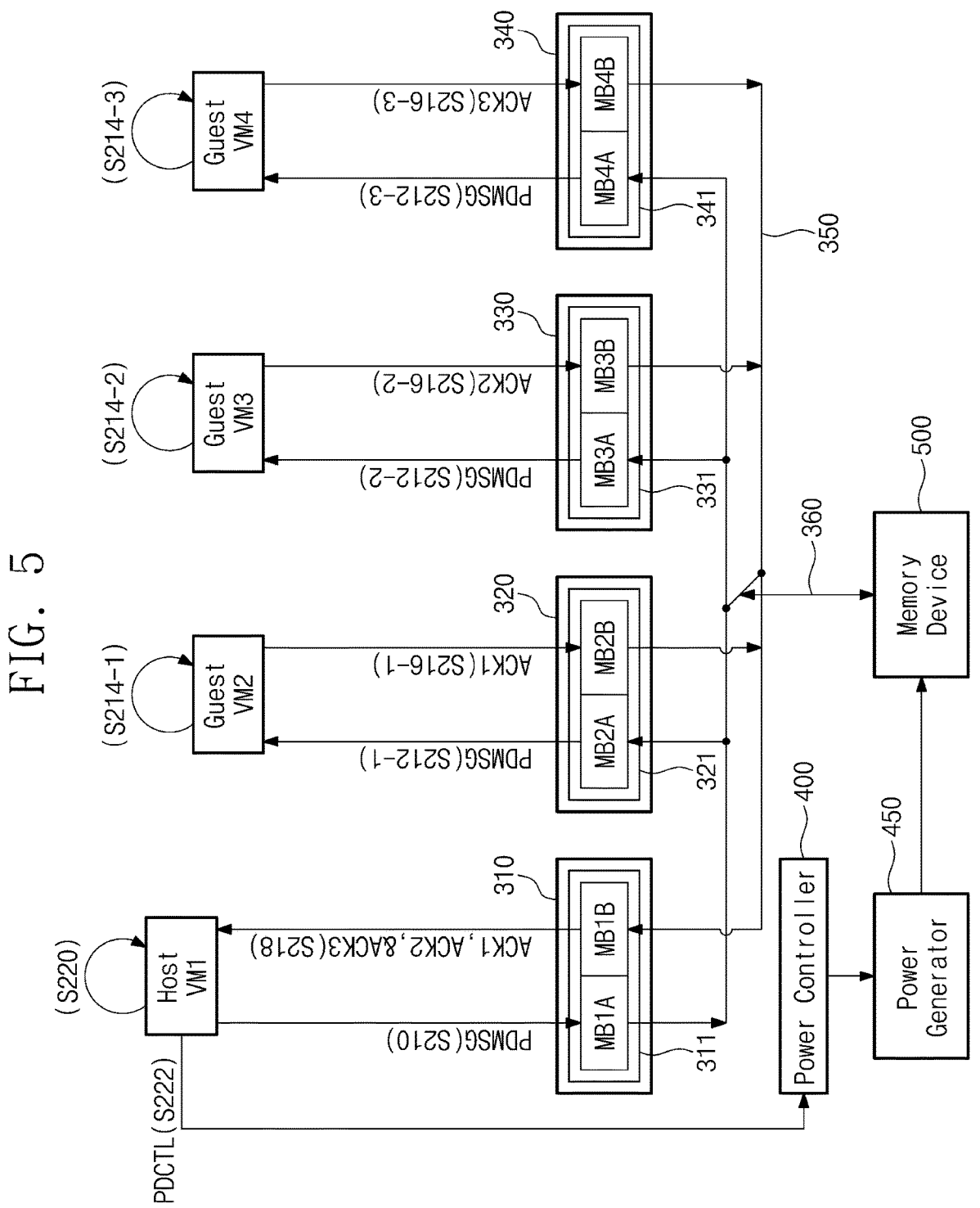
Figure 6:
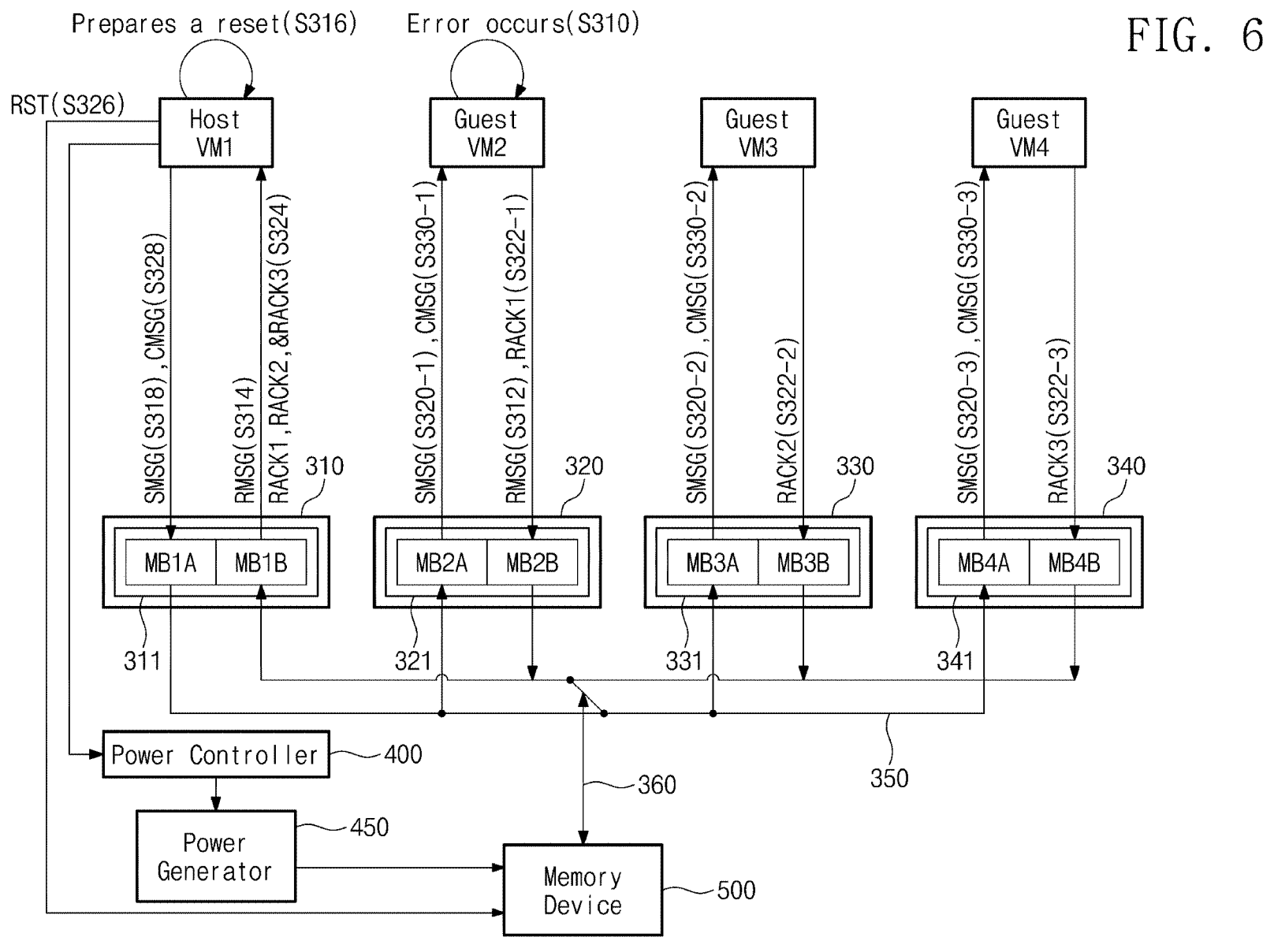

FIGS. 4, 5 and 6 are respective conceptual diagrams illustrating various operations performed by one or more virtual machines in the system-on-chip of FIG. 1 according to embodiments of the inventive concept.

Referring to FIGS. 4, the first bus 350 is assumed to connect the memory controllers 310, 320, 330, and 340, and the second bus 360 is assume to connect the first bus 350 and the memory device 500. Further assuming that the first virtual machine VM1 operates as the host virtual machine, the first virtual machine VM1 may control operation of the power controller 400. The power controller 400 may be used to control the power generator 450 which in tur may be used to turn ON/OFF power supplied to the memory device 500.

In some embodiment, the power generator 450 may include a voltage generator configured to generate one or more power voltage(s) supplied to the memory device 500. For example, the power generator 450 may be a DC-DC converter, a buck converter, and/or a buck-boost converter, but the scope of the inventive concept is not limited thereto.

The memory device 500 may include volatile memory cells and/or nonvolatile memory cells. In some embodiments, the memory device 500 may be a universal flash storage, but the scope of the inventive concept is not limited thereto.

Referring to FIGS. 1 and 4, the first device 610 is assumed to operate under control of the first virtual machine VM1, the second device 620 is assumed to operate under control of the second virtual machine VM2, the third device 630 is assumed to operate under control of the third virtual machine VM3, and the fourth device 640 is assumed to operate under control of the fourth virtual machine VM4. Here, each of the first device 610, the second device 620, the third device 630 and the fourth device 640 may be respectively distinct from the other devices. Ready examples of the devices 610, 620, 630, and 640 include a dashboard, a car navigation system, a head-up display system, a car audio system, a seat back display system, a rear seat display system, a camera system, etc.

As noted above, a power-on operation for the memory device 500 will be described in relation to FIGS. 1, 2, 3 and 4, wherein the first virtual machine VM1 is assumed to operate as the host virtual machine and the remaining virtual machines (VM2, VM3, and VM4) operate as guest virtual machines.

Accordingly, the first virtual machine VM1 generates a power-on control signal POCTL for supplying a power (e.g., one or more power voltage(s)) to the memory device 500, and provides the power-on control signal POCTL to the power controller 400 (S110). The power controller 400 controls the power generator 450 in response to the power-on control signal POCTL, and therefore the power generator 450 provides the one or more power voltages to the memory device 500.

An initialization sequence associated with the memory device 500 (S112) may be performed under the control of the first virtual machine VM1 before or after the generation of the power-on control signal POCTL by the first virtual machine VM1 (S110).

Until such time as each of the guest virtual machines VM2, VM3, and VM4 receives the power-on message POMSG, the guest virtual machines VM2, VM3, and VM4 are respectively assumed to be waiting for an instruction or performing some other work, task or operation (S114-1), (S114-2), and (S114-3).

Following completion of the initialization sequence for the memory device 500, the power-on message POMSG generated by the first virtual machine VM1 is sent to the first sub-mailbox MB1A of the first mailbox 311 (S116). Here, it is further assumed that the power-on message POMSG indicates that each of the virtual machines VM2, VM3, and VM4 may use the memory device 500 normally.

The power-on message POMSG is then sent from the first sub-mailbox MB1A of the first mailbox 311 to the guest virtual machines VM2, VM3, and VM4 through the first sub-mailboxes MB2A, MB3A, and MB4A respectively associated with the mailboxes 321, 331, and 341 (S118-1), (S118-2), and (S118-3).

Thereafter, the guest virtual machines VM2, VM3, and VM4 may perform (e.g.,) a booting sequence in response to the power-on message POMSG (S120-1), (S120-2), and (S120-3). After completion of the respective booting sequences, the guest virtual machines VM2, VM3, and VM4 may respectively and normally interact with (e.g., access) the memory device 500.

Referring to FIG. 5, the power-off operation for the memory device 500 will be described with reference to FIGS. 1, 2, 3 and 5. Here, a sequence for turning off power to one or more of the virtual machines VM2, VM3, and VM4 may be performed before the power-off operation for the memory device 500 is performed.

In order to perform the power-off operation for the memory device 500, the first virtual machine VM1 may generate the power-off-ready message PDMSG indicating a preparation state in relation to an impending power-off operation, and send the power-off-ready message PDMSG to the first sub-mailbox MB1A of the first mailbox 311 (S210).

Thereafter, the power-off-ready message PDMSG may be respectively sent from the first sub-mailbox MB1A of the first mailbox 311 to the guest virtual machines VM2, VM3, and VM4 through the first sub-mailboxes MB2A, MB3A, and MB4A of the mailboxes 321, 331, and 341 (S212-1), (S212-2), and (S212-3).

In response to the power-off-ready message PDMSG, each of the guest virtual machines VM2, VM3, and VM4, if currently active, will stop performing a current operation (S214-1), (S214-2), and (S214-3). Upon stopping operation, each of the guest virtual machines VM2, VM3, and VM4 generates a respective, preparation-complete message ACK1, ACK2, and ACK3 indicating completion of preparation for the impending power-off operation. Then, each of the guest virtual machines VM2, VM3, and VM4 respectively sends the preparation-complete message ACK1, ACK2, and ACK3 to the second sub-mailboxes MB2B, MB3B, and MB4B of the mailboxes 321, 331, and 341 (S216-1), (S216-2), and (S216-3).

The second sub-mailbox MB1B of the first mailbox 311 may then receive the respective, preparation-complete messages ACK1, ACK2, and ACK3 from the second sub-mailboxes MB2B, MB3B, and MB4B of the mailboxes 321, 331, and 341 to the first virtual machine VM1 (S218).

Once the first virtual machine VM1 receives the preparation-complete messages ACK1, ACK2, and ACK3 (S220), it may generate a power-off control signal PDCTL that turns off power supplied to the memory device 500, and sends the power-off control signal PDCTL to the power controller 400 (S222). And in response to the power-off control signal PDCTL, the power controller 400 controls the power generator 450 to turn off the power supplied to the memory device 500.

Referring to FIG. 6, a reset operation for the memory device 500 will be described with reference to FIGS. 1, 2, 3 and 6.

For example, if an unrecoverable error occurs in one or more of the virtual machine VM1, VM2, VM3, or VM4 while the corresponding virtual machine VM1, VM2, VM3, or VM4 processes an I/O command, the memory device 500 may require reset. Here, the term "unrecoverable error" may denote a software error and/or a hardware error. Thus, if an unrecoverable error occurs in the host virtual machine VM1 or one of the guest virtual machines VM2, VM3, and VM3, it becomes necessary for the host virtual machine VM1 to variously communicate with the through the mailboxes 311, 321, 331, and 341.

As one example, the illustrated example of FIG. 6 proceeds from an assumption that the second virtual machine VM2 operating as a guest virtual machine experiences an unrecoverable error and must recover from same. Accordingly, when the unrecoverable error occurs in the second virtual machine VM2 (S310), the second virtual machine VM2 may generate a reset request message RMSG indicating a reset requirement, and send the reset request message RMSG to the second sub-mailbox MB2B of the second mailbox 321 (S312). Thereafter, the reset request message RMSG from the second sub-mailbox MB2B of the second mailbox 321 may be sent to the first virtual machine VM1 through the second sub-mailbox MB1B of the first mailbox 311 (S314).

Upon receiving the reset request message RMSG, the first virtual machine VM1 stops performing a current operation and performs a reset preparation (S316).

When the reset preparation is complete, the first virtual machine VM1 may generate a reset-ready message SMSG indicating that the virtual machines VM2, VM3, and VM4 should prepare for reset, and send the reset-ready message SMSG to the first sub-mailbox MB1A of the first mailbox 311 (S318). And the reset-ready message SMSG from the first sub-mailbox MB1A of the first mailbox 311 may be sent to the virtual machines VM2, VM3, and VM4 through the first sub-mailboxes MB2A, MB3A, and MB4A of the mailboxes 321, 331, and 341 (S320-1), (S320-2), and (S320-3).

Once the respective virtual machines VM2, VM3, and VM4 complete reset preparation (e.g., stopping current operations) in response to the reset-ready messages SMSG communicated through the first sub-mailboxes MB2A, MB3A, and MB4A, each of the virtual machines VM2, VM3, and VM4 may generate a reset-ready completion message RACK1, RACK2, and RACK3 indicating that reset preparation is complete. Thereafter, the reset-ready completion messages RACK1, RACK2, and RACK3 may be communicated to the first virtual machine VM1 through second sub-mailboxes MB2B, MB3B, and MB4B of the mailboxes 321, 331, and 341 (S322-1), (S322-2), and (S322-3). Accordingly, the reset-ready completion messages RACK1, RACK2, and RACK3 from the second sub-mailboxes MB2B, MB3B, and MB4B may be sent to the first virtual machine VM1 through the second sub-mailbox MB1B of the first mailbox 311 (S324).

Upon receiving the reset-ready completion messages RACK1, RACK2, and RACK3, the first virtual machine VM1 may generate a reset control signal RST that resets the memory device 500, and sends the reset control signal RST to the memory device 500 (e.g., through the reset pin 112) (S326). The memory device 500 is reset in response to the reset control signal RST.

After the memory device 500 has been reset, the first virtual machine VM1 may generate a reset completion message CMSG, and send the reset completion message CMSG to the first sub-mailbox MB1A of the first mailbox 311 (S328). That is, the reset completion message CMSG from the first sub-mailbox MB1A of the first mailbox 311 may be sent to the virtual machines VM2, VM3, and VM4 through the first sub-mailboxes MB2A, MB3A, and MB4A of the mailboxes 321, 331, and 341 (S330-1), (S330-2), and (S330-3), such that the virtual machines VM2, VM3, and VM4 receive the reset completion message CMSG and may determine that the memory device 500 has been reset.

The foregoing operations described in relation to FIGS. 4, 5 and 6 are merely representative example of many operations that may be performed by constituent virtual machines in a system-on-chip consistent with embodiments of the inventive concept using respective mailboxes. Thus, methods and devices according to embodiments of the inventive concept may use mailboxes included in memory controllers and implemented in hardware to communicate a range of messages between virtual machines, instead of using a hypervisor as an intermediary between the virtual machines. As a result communication between virtual machines is faster, yet also more efficient and more stable. And in some embodiments, the foregoing approach allows omission of the hypervisor from system design.

While the inventive concept has been described with reference to certain illustrated embodiments, it will be apparent to those of ordinary skill in the art that various changes and modifications may be made thereto without departing from the scope of the inventive concept as set forth in the following claims.

What is claimed is:

1. A system on chip comprising:
a first virtual machine;
a second virtual machine;
a first memory controller including a first mailbox, and configured to control operation of a memory device under control of the first virtual machine; and
a second memory controller including a second mailbox, and configured to control operation of the memory device under control of the second virtual machine,
wherein the first mailbox and the second mailbox are directly connected in hardware via a bus.

2. The system on chip of claim 1, further comprising:
a multi-core processor including a first processor core and a second processor core,
wherein the first virtual machine includes a first operating system executable in the first processor core, and the second virtual machine includes a second operating system executable in the second processor core.

3. The system on chip of claim 1, wherein the first mailbox includes a first sub-mailbox configured to communicate outgoing messages and a second sub-mailbox separate from the first sub-mailbox and configured to communicate incoming messages.

4. The system on chip of claim 1, wherein the first virtual machine is further configured to generate a first message associated with operation of the memory device and send the first message to the second virtual machine through the first mailbox and the second mailbox.

5. The system on chip of claim 4, wherein the first message is one of a power-on message for the memory device, a power-off message for the memory device and a reset message for the memory device.

6. The system on chip of claim 4, wherein, when the first virtual machine is a host virtual machine and the second virtual machine is a guest virtual machine,
the second virtual machine performs a booting sequence in response to the first message.

7. The system on chip of claim 4, wherein, after the first virtual machine generates a power-on control signal for powering on the memory device, the first virtual machine generates the first message.

8. The system on chip of claim 4, wherein, after the second virtual machine completes operation corresponding to the first message, the second virtual machine generates a second message, and
wherein the second virtual machine sends the second message to the first virtual machine through the first mailbox and the second mailbox.

9. The system on chip of claim 8, wherein the first mailbox includes a first sub-mailbox and a second sub-mailbox,
wherein the second mailbox includes a first sub-mailbox and a second sub-mailbox,
wherein, when the first virtual machine is a host virtual machine and the second virtual machine is a guest virtual machine,
the first message is sent to the second virtual machine through the first sub-mailbox of the first mailbox and the first sub-mailbox of the second mailbox, and
the second message is sent to the first virtual machine through the second sub-mailbox of the second mailbox and the second sub-mailbox of the first mailbox.

10. The system on chip of claim 8, wherein, after the first virtual machine receives the second message, the first virtual machine generates a power-off control signal for powering off the memory device.

11. The system on chip of claim 1, wherein, when the first virtual machine is a host virtual machine and the second virtual machine is a guest virtual machine,
the guest virtual machine generates a first message indicating that an error occurs in the guest virtual machine and sends the first message to the host virtual machine through the second mailbox and the first mailbox,
the host virtual machine stops performing operation in response to the first message, generates a second message indicating reset preparation, and sends the second message to the guest virtual machine through the first mailbox and the second mailbox,
the guest virtual machine completes the reset preparation in response to the second message, generates a third message indicating completion, and send the third message to the host virtual machine through the second mailbox and the first mailbox, and
the host virtual machine generates a reset control signal for resetting the memory device in response to the third message, generates a fourth message after the memory device is completely reset, and sends the fourth message to the guest virtual machine through the first mailbox and the second mailbox.

12. An in-vehicle infotainment system comprising:
a nonvolatile memory device; and
a system on chip configured to control operation of the nonvolatile memory device, wherein the system on chip includes:

a first virtual machine;

a second virtual machine;

a first memory controller including a first mailbox, and configured to control operation of the nonvolatile memory device under control of the first virtual machine; and a second memory controller including a second mailbox, and configured to control operation of the nonvolatile memory device under control of the second virtual machine, wherein the first mailbox and the second mailbox are directly connected in hardware via a bus.

13. The in-vehicle infotainment system of claim 12, wherein, when the first virtual machine is a host virtual machine and the second virtual machine is a guest virtual machine, the host virtual machine generates a message associated with a power-on or a power-off of the nonvolatile memory device, and the message is sent to the second virtual machine through the first mailbox and the second mailbox.

14. The in-vehicle infotainment system of claim 12, wherein, when the first virtual machine is a host virtual machine and the second virtual machine is a guest virtual machine, the first virtual machine generates a message associated with a reset of the nonvolatile memory device, and the message is sent to the second virtual machine through the first mailbox and the second mailbox.

15. The in-vehicle infotainment system of claim 12, wherein, when the first virtual machine is a host virtual machine and the second virtual machine is a guest virtual machine, the host virtual machine generates a message associated with a power-on of the nonvolatile memory device, the message is sent to the guest virtual machine through the first mailbox and the second mailbox, and the guest virtual machine performs a booting sequence in response to the message.

16. The in-vehicle infotainment system of claim 15, wherein the host virtual machine generates a power-on control signal for supplying a power to the nonvolatile memory device, and wherein, after the power is supplied to the nonvolatile memory device, the host virtual machine generates the message.

17. The in-vehicle infotainment system of claim 12, further comprising:

a first device operating under control of the first virtual machine; and a second device operating under control of the second virtual machine, wherein the first device includes one of a dashboard, a navigation system, an audio system, and a camera system, and the second device includes another one of the dashboard, the navigation system, the audio system, and the camera system.

18. A method for communicating between a first virtual machine and a second virtual machine, the method comprising:

generating a message using the first virtual machine;

storing the message in a first mailbox associated with a first memory controller;

checking, by the second virtual machine, for the message in a second mailbox associated with a second memory controller; and sending the message stored in the second mailbox to the second virtual machine using the second memory controller, wherein the first mailbox and the second mailbox are directly connected via a bus.

19. The method of claim 18, further comprising:

when the first virtual machine is a host virtual machine and the second virtual machine is a guest virtual machine, generating a power-on control signal for controlling a power-on of a memory device using the first virtual machine;

after the memory device is completely powered on, generating the message using the first virtual machine; and performing a booting sequence in response to the message using the second virtual machine.

20. The method of claim 18, further comprising:

when the first virtual machine is a guest virtual machine and the second virtual machine is a host virtual machine, generating a power-off control signal for powering off a memory device in response to the message using the host virtual machine.

* * * * *